(12) United States Patent
Cho et al.

(10) Patent No.: US 8,793,136 B2
(45) Date of Patent: Jul. 29, 2014

(54) METHOD AND APPARATUS FOR SMART VOICE RECOGNITION

(75) Inventors: Eunhyung Cho, Seoul (KR); Joohyeon Oh, Seoul (KR); Howon Son, Seoul (KR)

(73) Assignee: LG Electronics Inc., Seoul (KR)

( * ) Notice: Subject to any disclaimer, the term of this patent is extended or adjusted under 35 U.S.C. 154(b) by 246 days.

(21) Appl. No.: 13/399,283

(22) Filed: Feb. 17, 2012

(65) Prior Publication Data

US 2013/0218572 A1     Aug. 22, 2013

(51) Int. Cl.
*G10L 21/00*    (2013.01)
*G10L 25/00*    (2013.01)
*G10L 15/00*    (2013.01)
*G10L 15/18*    (2013.01)

(52) U.S. Cl.
USPC .......................... 704/275; 704/270; 704/257

(58) Field of Classification Search
None
See application file for complete search history.

(56) References Cited

U.S. PATENT DOCUMENTS

| | | | |
|---|---|---|---|
| 6,415,257 B1 * | 7/2002 | Junqua et al. | 704/275 |
| 7,260,538 B2 * | 8/2007 | Calderone et al. | 704/275 |
| 7,908,146 B2 * | 3/2011 | Kaneko et al. | 704/275 |
| 8,069,041 B2 * | 11/2011 | Kuboyama et al. | 704/236 |
| 8,121,846 B2 * | 2/2012 | Reichardt et al. | 704/275 |
| 8,175,885 B2 * | 5/2012 | Sureka et al. | 704/270.1 |
| 2002/0143551 A1 * | 10/2002 | Sharma et al. | 704/270.1 |
| 2010/0076763 A1 | 3/2010 | Ouchi et al. | |
| 2012/0035935 A1 | 2/2012 | Park et al. | |

FOREIGN PATENT DOCUMENTS

| | | |
|---|---|---|
| JP | 2007-219122 A | 8/2007 |
| JP | 2010-072507 A | 4/2010 |
| JP | 2011-081541 A | 4/2011 |
| KR | 2012-0012919 A | 2/2012 |

OTHER PUBLICATIONS

International Search Report and Written Opinion for Application No. PCT/KR2012/009887 dated Mar. 21, 2013, 11 pages.

* cited by examiner

*Primary Examiner* — Jesse Pullias

(74) *Attorney, Agent, or Firm* — Fish & Richardson P.C.

(57) ABSTRACT

A display device with a voice recognition capability may be used to allow a user to speak voice commands for controlling certain features of the display device. As a means for increasing operational efficiency, the display device may utilize a plurality of voice recognition units where each voice recognition unit may be assigned a specific task.

24 Claims, 16 Drawing Sheets

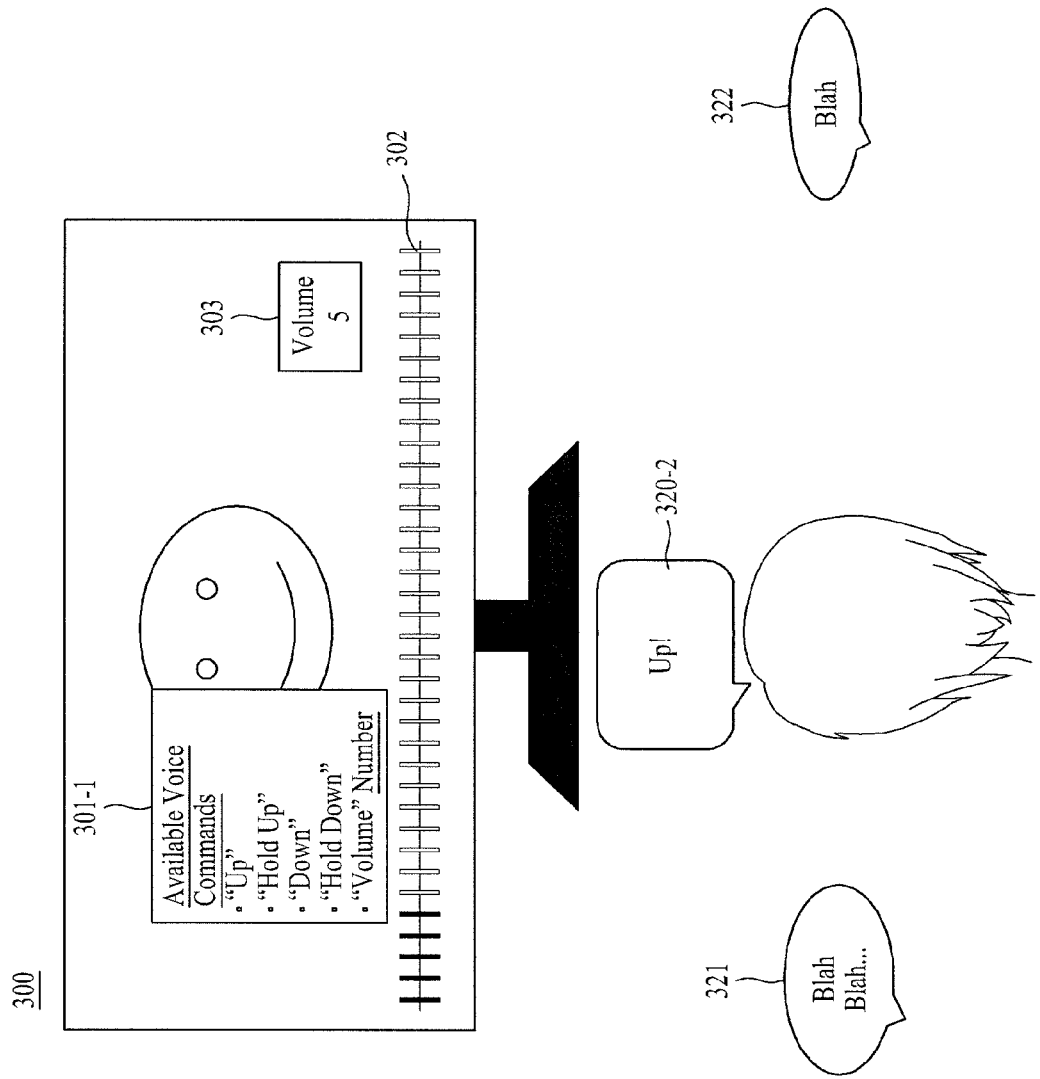

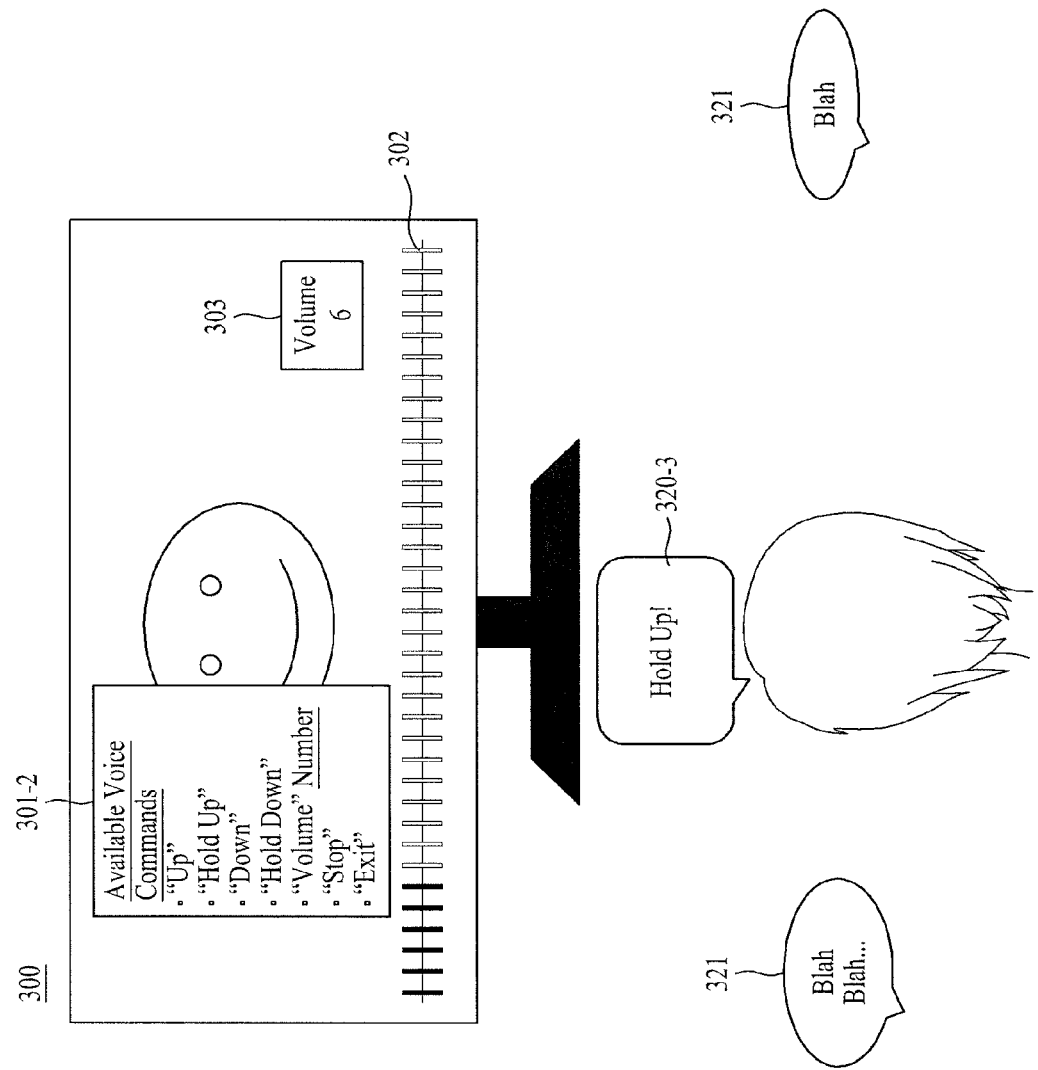

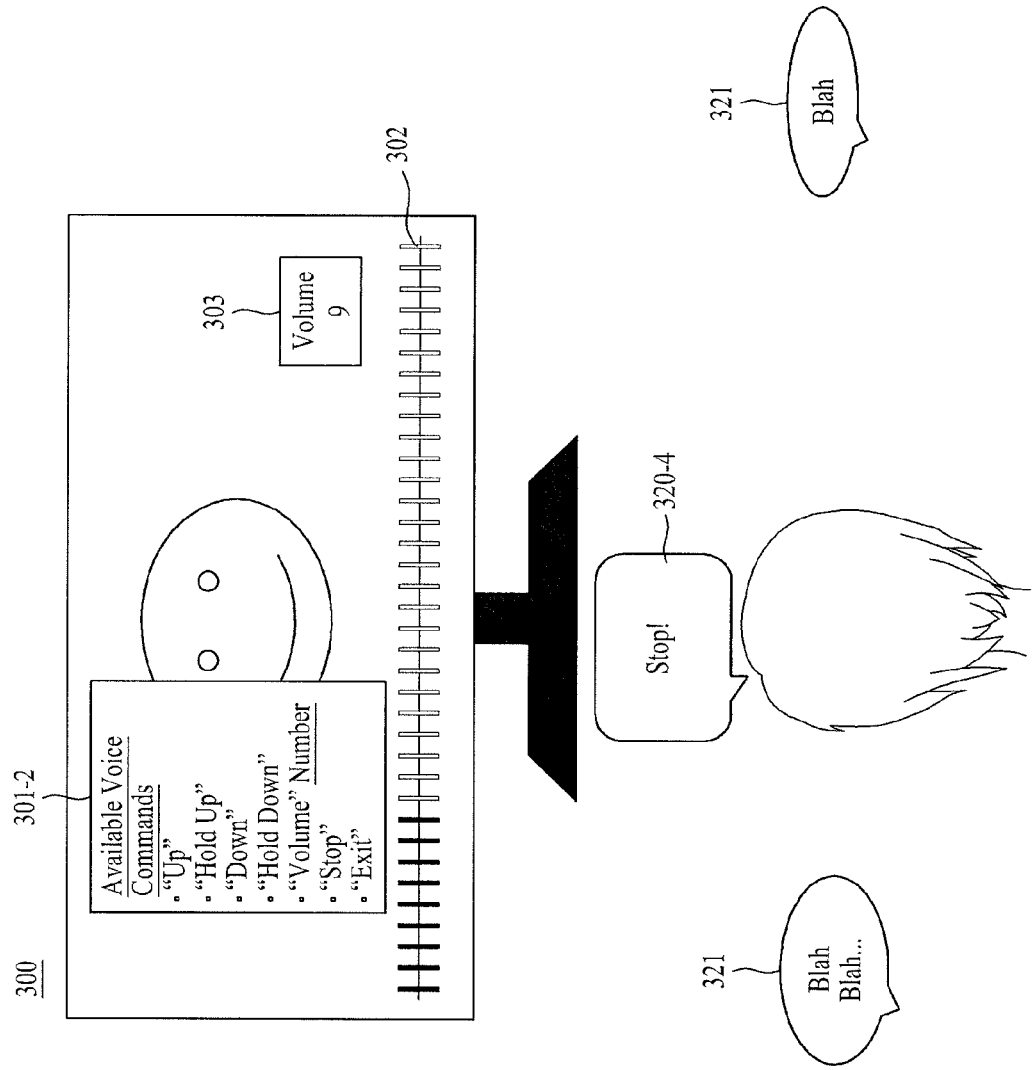

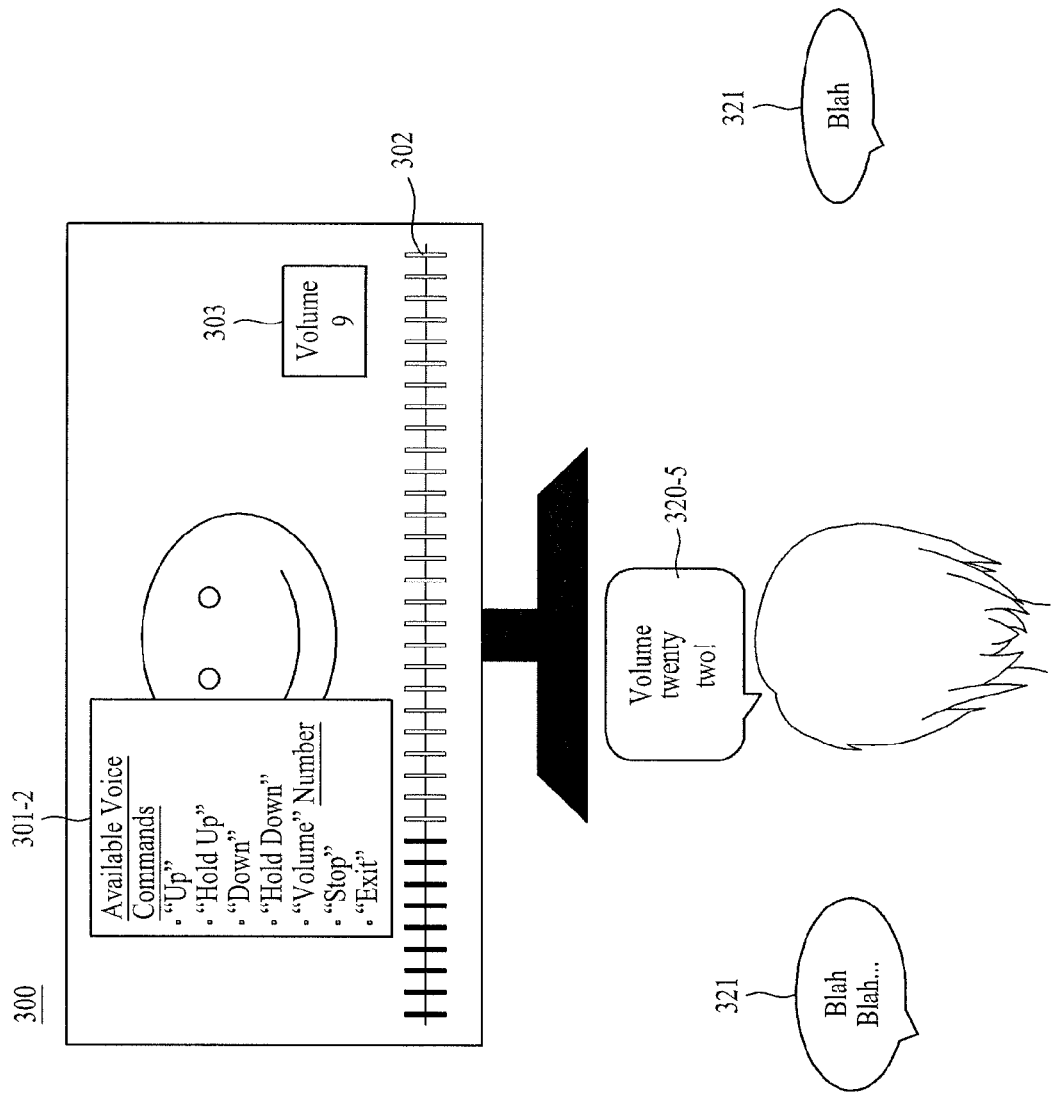

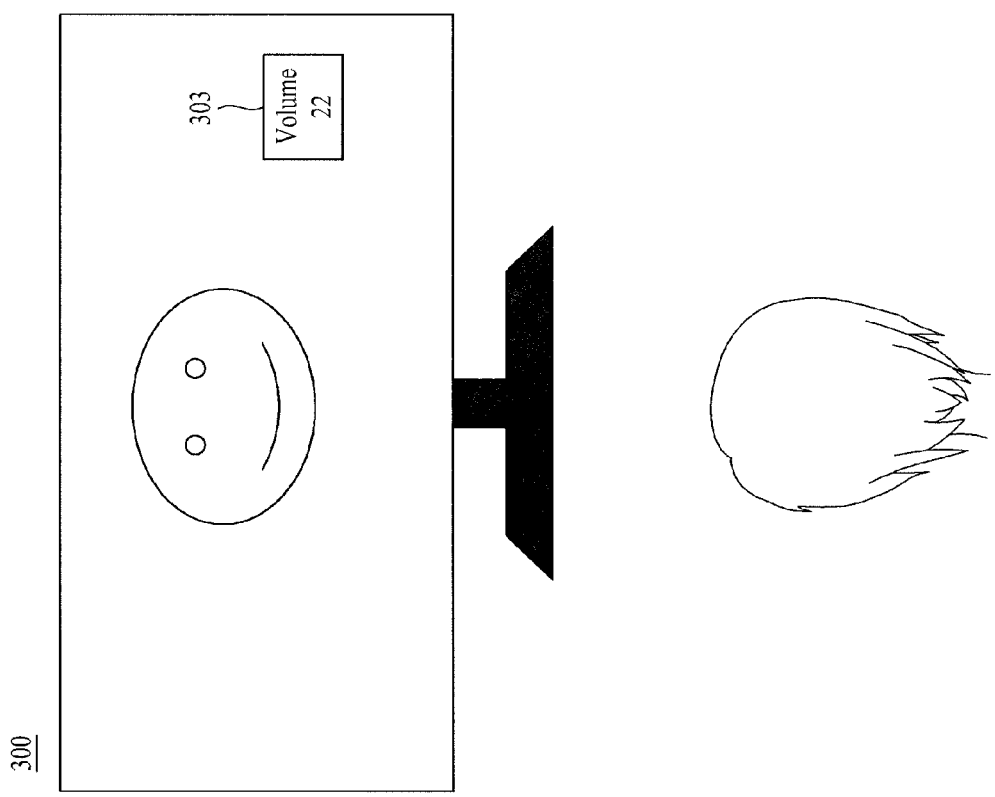

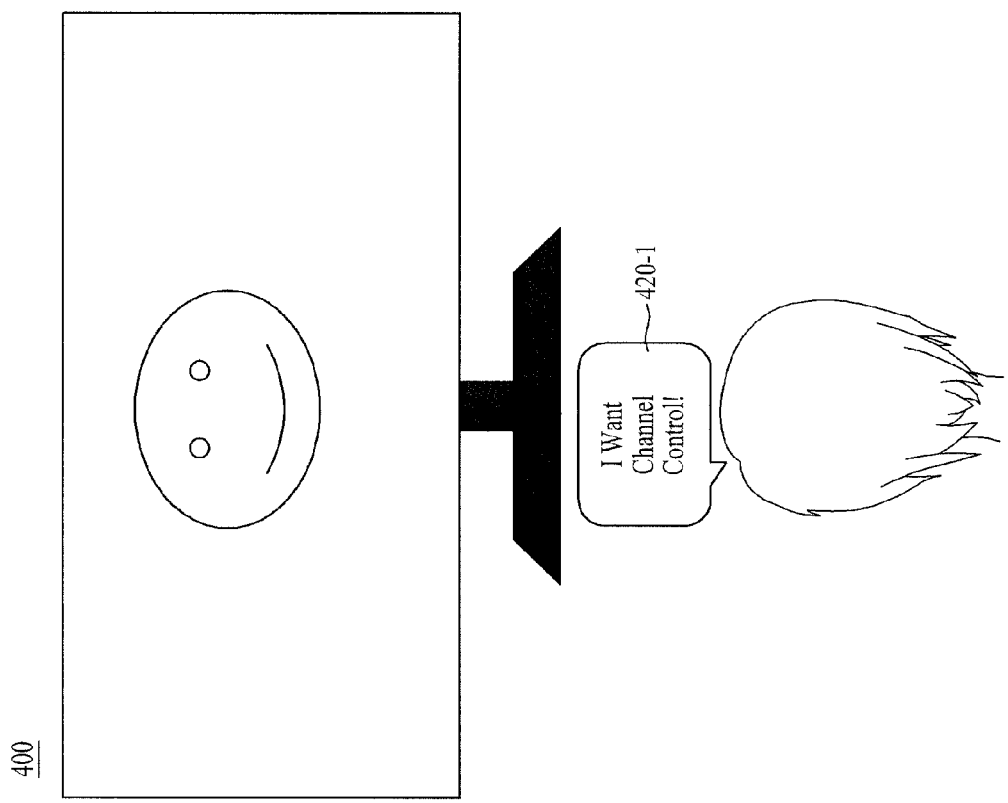

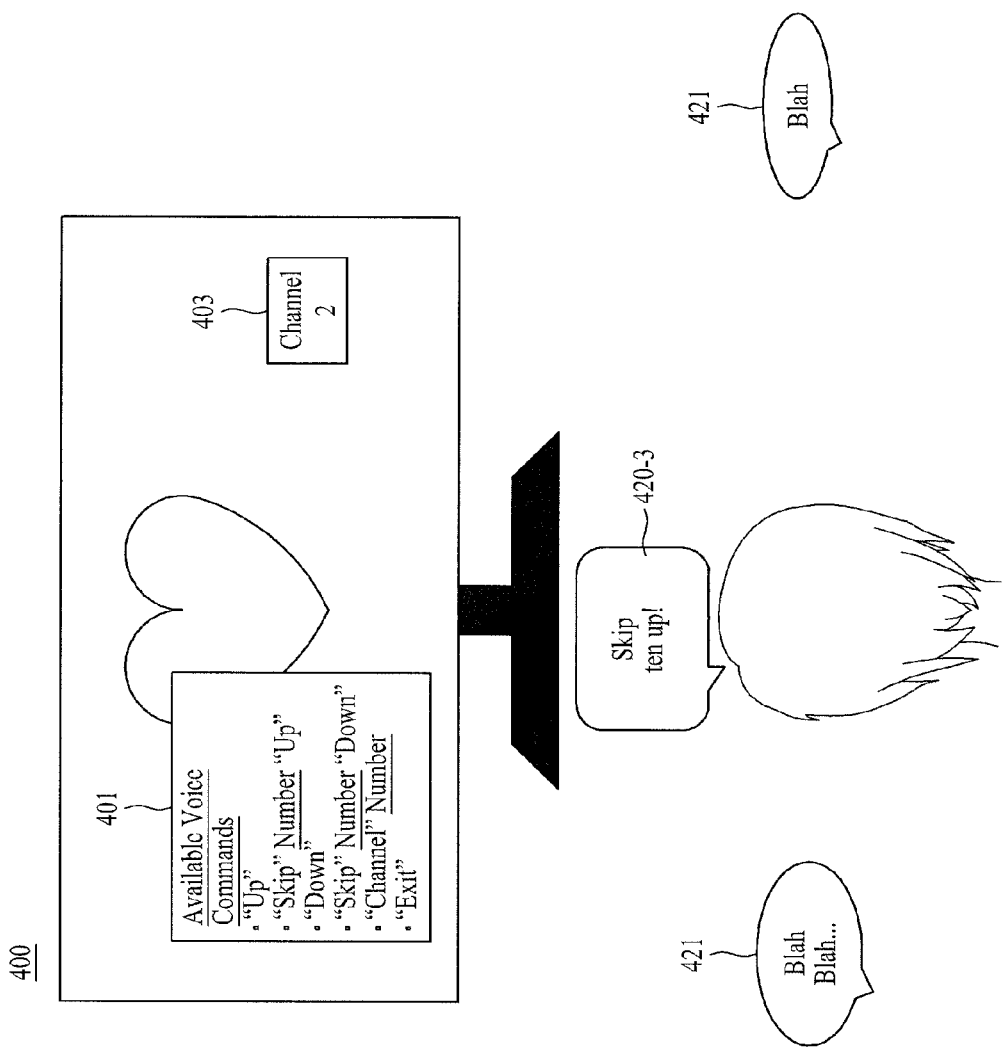

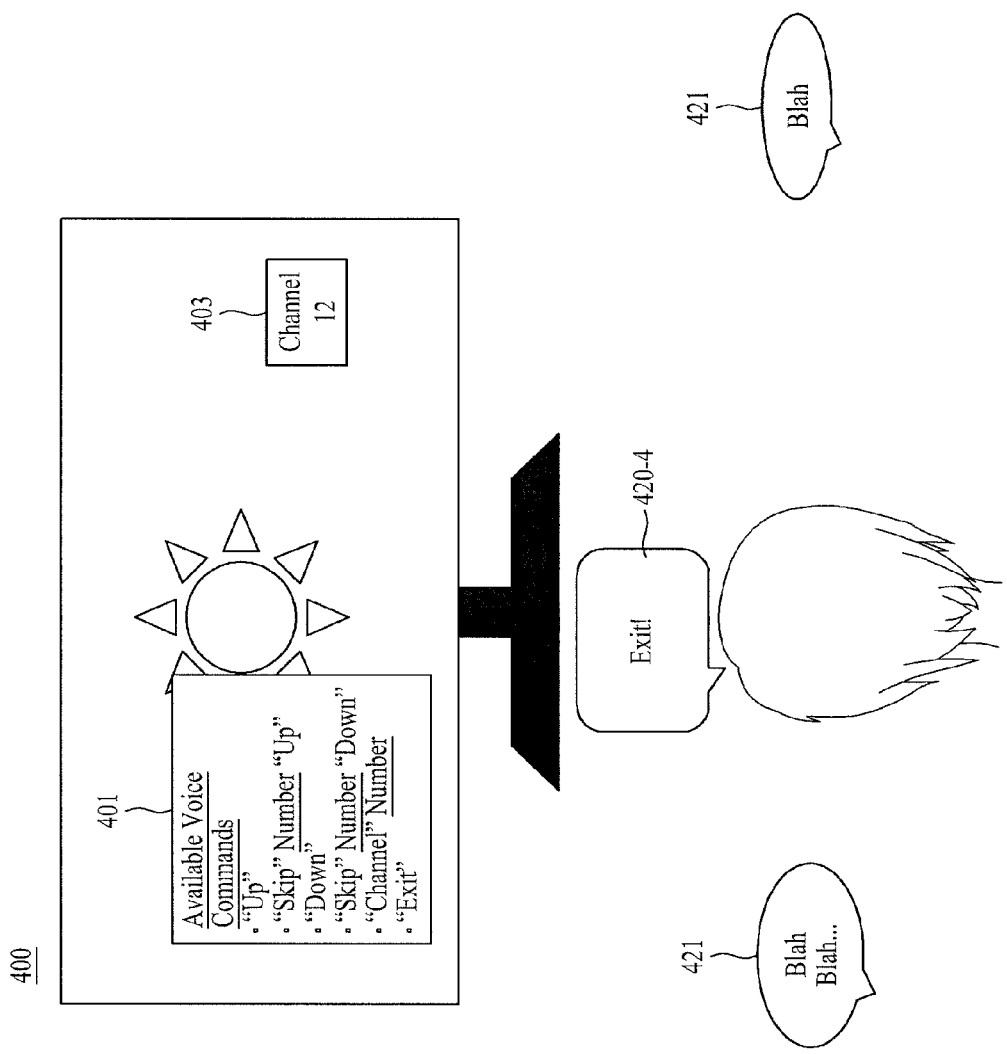

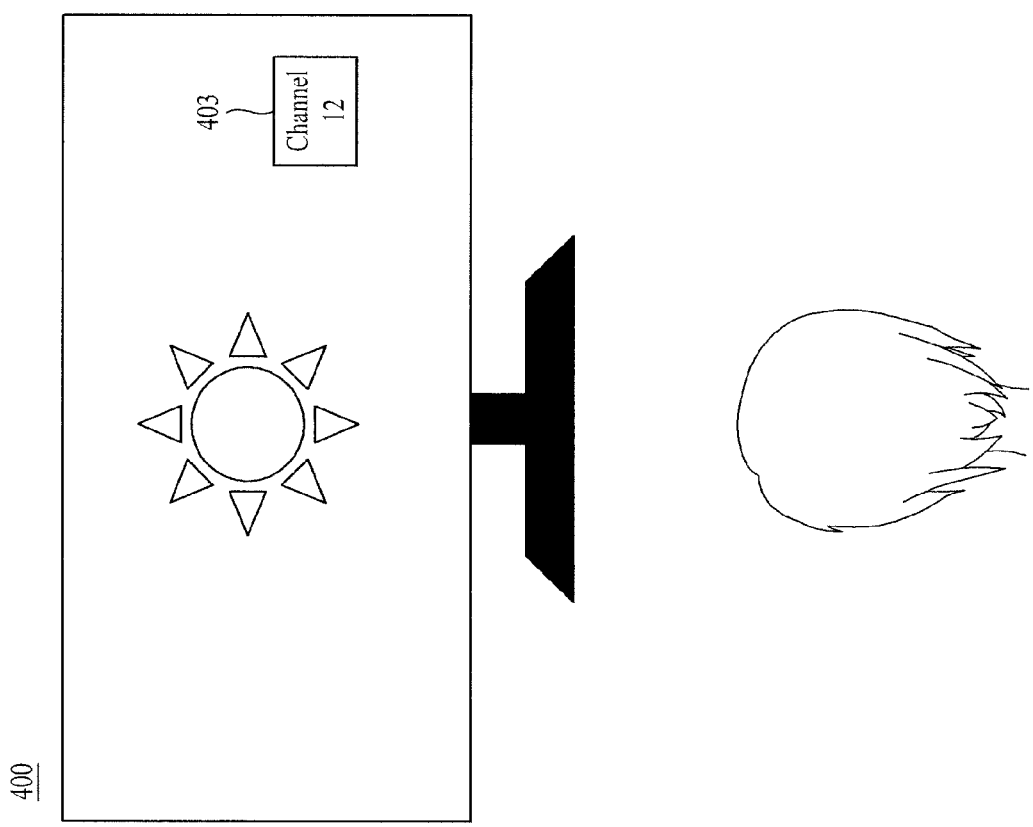

METHOD AND APPARATUS FOR SMART VOICE RECOGNITION

BACKGROUND OF THE INVENTION

Television sets have increased in popularity to become an integral part of home entertainment culture. And as the technology put into televisions have become more advanced, the user experience has correspondingly evolved. Users can not only utilize the modern television for viewing broadcast programs, but also connect to the internet to view online content.

The purpose of continuing to include new technologies into the television is to provide a better user experience. Similarly, advances in television technology have allowed users to no longer be limited to controlling the television by pushing keys on a remote control. While the remote controller concept still serves an important function, Instead, a variety of different gestures may be made by the user that can be recognized by the television as a control command. One such gesture is a voice command spoken by the user to control certain features of the television.

However, one major deficiency of previous voice recognition systems has been the placement of the actual voice recognition unit on an offsite server instead of within the circuitry of the television itself. This setup can be seen in FIG. 1. When a voice input is received by a television 100, the voice input must be transmitted via a network 105 to a voice recognition unit located on an external server 110. Then the voice recognition unit will process the voice input to determine whether the voice input can be recognized as a known voice command. The resulting determination of a recognized voice command must then be transmitted back to the television 100 via the network 105. So in such a setup, the ability of a user to make voice input commands and have the television recognize the user's voice input command is severely limited by the need to communicate with an offsite server that stores the voice recognition unit.

Therefore it follows that there exists a need to develop a television that is able to easily and efficiently recognize a user's voice command and control features of the television accordingly.

SUMMARY OF THE INVENTION

Accordingly, the present invention is directed to a display device that incorporates a plurality of voice recognition units for receiving and recognizing a user's voice input command. Therefore it is an object of the present invention to substantially resolve the limitations and deficiencies of the related art when it comes to controlling a display device by use of the user's voice input command.

It is another object of the present invention to decrease the occurrences of errors during a natural language voice recognition process by dedicating at least one voice recognition unit to process a user's natural language voice command. In addition, at least one voice recognition unit may be dedicated to processing a user's voice command that belongs to a list of preset voice commands.

To achieve these objectives, the present invention discloses a method of recognizing voice input commands by a display device, the method comprising: receiving a first voice input; recognizing, by a first voice recognizing unit, the first voice input as a first voice command to be processed by a second voice recognizing unit; processing the first voice command, by the second voice recognizing unit, and controlling a feature of the display device according to the first voice command.

Preferably, the first voice command is a natural language voice command, and the recognition of the first voice command initiates a voice input command mode.

Preferably, the feature of the display device controlled according to the first voice command comprises displaying a first menu of available voice commands.

Preferably, the first voice input is received through an external network.

Preferably, the invention further comprises receiving a second voice input; recognizing, by the first voice recognizing unit, the second voice input as a second voice command to be processed by the first voice recognizing unit; processing the second voice command, by the first voice recognizing unit, and controlling a feature of the display device according to the second voice command.

More preferably, the second voice command corresponds to one of the voice commands displayed on the first menu of available voice commands, as only voice inputs corresponding to voice commands displayed on the first menu of available voice commands are recognized by the first voice recognizing unit.

More preferably, the feature of the display device is controlled to increase by one unit of a display device setting in response to the second voice command.

More preferably, the feature of the display device is one of a volume, channel, color, brightness, contrast, menu or page setting.

More preferably, the feature of the display device is controlled to increase by a predetermined number of display device setting units in response to the second voice command.

More preferably, the feature of the display device is one of a volume, channel, color, brightness, contrast, menu or page setting.

Preferably the invention further comprises, displaying a second menu of available voice commands, wherein the second menu includes at least one new available voice command not displayed on the first menu of available voice commands.

Preferably, the first voice recognizing unit and the second voice recognizing unit are embedded as part of the circuitry of the display device, the first voice recognizing unit and the second voice recognizing unit are located on an external server, or the first voice recognizing unit is embedded as part of the circuitry of the display device and the second voice recognition unit is located on an external server.

To further achieve the objectives of the present invention, the present invention also discloses a method of recognizing voice input commands by a display device, the method comprising: receiving a first voice input; recognizing, by a first voice recognizing unit, the first voice input as a first voice command to be processed by the first voice recognizing unit; processing the first voice command, by the first voice recognizing unit, and controlling a feature of the display device according to the first voice command.

Preferably, the feature of the display device is controlled to stop increasing in response to the first voice command.

Preferably, the feature of the display device is one of a volume, channel, color, brightness, contrast, menu or page setting.

To further achieve the objectives of the present invention, the present invention further discloses a display device comprising: a microphone configured to receive a first voice input; a first voice recognizing unit configured to receive the first voice input and recognize the first voice input as a voice input not to be further processed by the first voice recognizing unit; a second voice recognizing unit configured to receive the first voice input and process the first voice input to obtain a first voice command, and a system controller configured to control a feature of the display device in accordance to the first voice command.

Preferably, the first voice command is a natural language voice command, and the recognition of the first voice command initiates a voice input command mode.

Preferably, the invention further comprises: a display configured to display a first menu of available voice commands, wherein the display of the first menu of available voice commands is the feature controlled according to the first voice command.

More preferably, the first voice input is received through an external network.

More preferably, the first voice recognizing unit is further configured to receive a second voice input and process the second voice input to obtain a second voice command, and wherein the system controller is further configured to control a feature of the display device in accordance to the second voice command.

More preferably, the second voice command corresponds to one of the voice commands displayed on the first menu of available voice commands, as only voice inputs corresponding to voice commands displayed on the menu of available voice commands are recognized by the first voice recognizing unit.

Preferably, the feature of the display device is controlled to increase by one unit in response to the second voice command.

More preferably, the display device of claim 22, wherein the feature of the display device is one of a volume, channel, color, brightness, contrast, menu or page setting.

Preferably, the feature of the display device is controlled to increase by a predetermined number of units in response to the second voice command.

More preferably, the feature of the display device is one of a volume, channel, color, brightness, contrast, menu or page setting.

Preferably, a second menu of available voice commands is displayed following the controlling of the feature of the display device according to the second voice command, wherein the second menu includes at least one additional voice command from the first menu of available voice commands.

Preferably, the second voice recognizing unit is located on an external server.

In order to further achieve the objects of the present invention, the present invention further discloses a display device comprising: a microphone configured to receive a first voice input and a second voice input; a first voice recognizing unit configured to receive the first voice input and process the first voice input to obtain a first voice command; a second voice recognizing unit configured to receive the second voice input and process the second voice input to obtain a second voice command, and a system controller configured to control a first feature of the display device in accordance to the first voice command and control a second feature of the display device in accordance to the second voice command.

Preferably, the first feature of the display device is controlled to stop increasing in response to the first voice command.

More preferably, the first feature of the display device is one of a volume, channel, color, brightness, contrast, menu or page setting.

BRIEF DESCRIPTION OF THE DRAWINGS

FIG. 3B illustrates a second scene for inputting a second voice command, according to some embodiments of the present invention;

FIG. 3C illustrates a third scene for inputting a third voice command, according to some embodiments of the present invention;

FIG. 3D illustrates a fourth scene for inputting a fourth voice command, according to some embodiments of the present invention;

FIG. 3E illustrates a fifth scene for inputting a fifth voice command, according to some embodiments of the present invention;

FIG. 3G illustrates a seventh scene where the television is returned to a default state, according to some embodiments of the present invention;

FIG. 4A illustrates a first scene for inputting a first command for initiating a voice recognition function, according to some embodiments of the present invention;

FIG. 4C illustrates a third scene for inputting a third voice command, according to some embodiments of the present invention;

FIG. 4D illustrates a fourth scene for inputting a fourth voice command, according to some embodiments of the present invention;

FIG. 4E illustrates a fifth scene where the television is returned to a default state, according to some embodiments of the present invention

DETAILED DESCRIPTION OF THE INVENTION

Reference will now be made in detail to exemplary embodiments of the present invention, examples of which are illustrated in the accompanying drawings. It will be apparent to one of ordinary skill in the art that in certain instances of the following description, the present invention is described without the specific details of conventional details in order to avoid unnecessarily distracting from the present invention. Wherever possible, like reference designations will be used throughout the drawings to refer to the same or similar parts. All mention of a display device is to be understood as being made to a display device of the present invention unless specifically explained otherwise.

Figure 1:
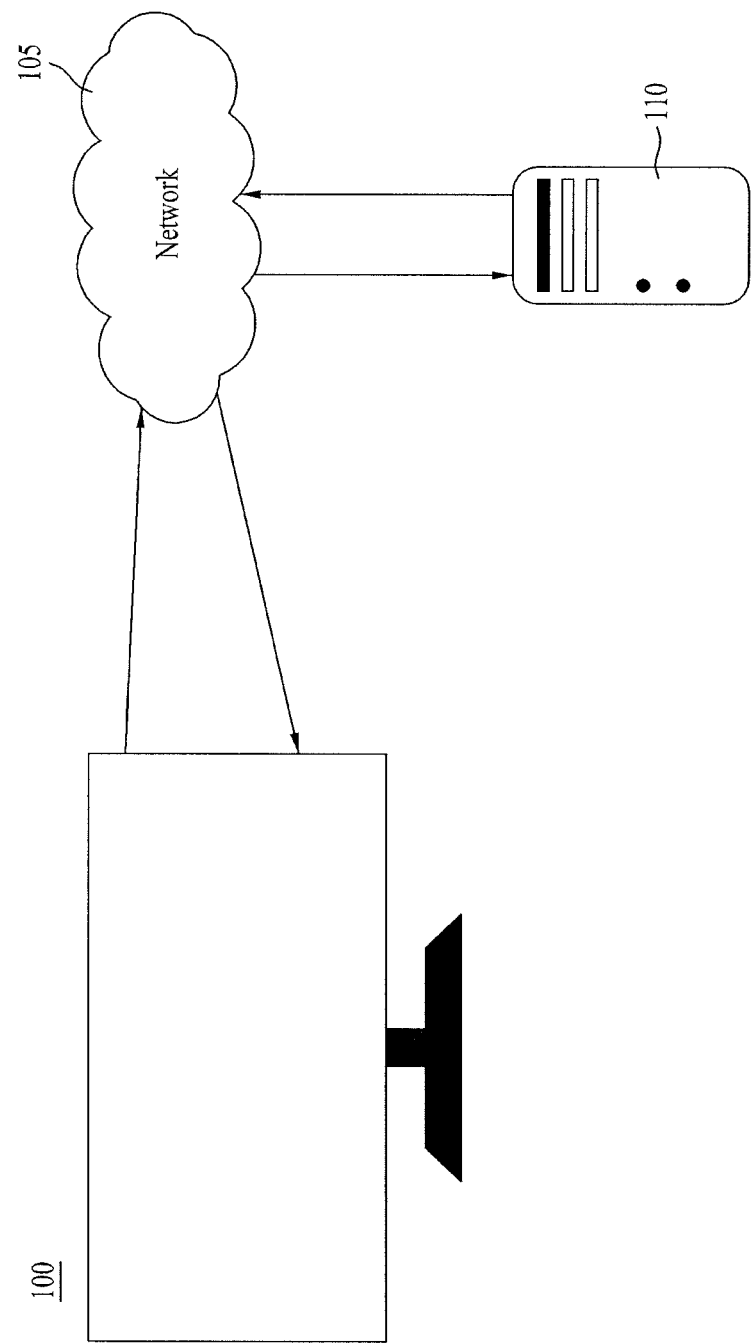
FIG. 1 illustrates a voice recognition system of the prior art.
Figure 2:
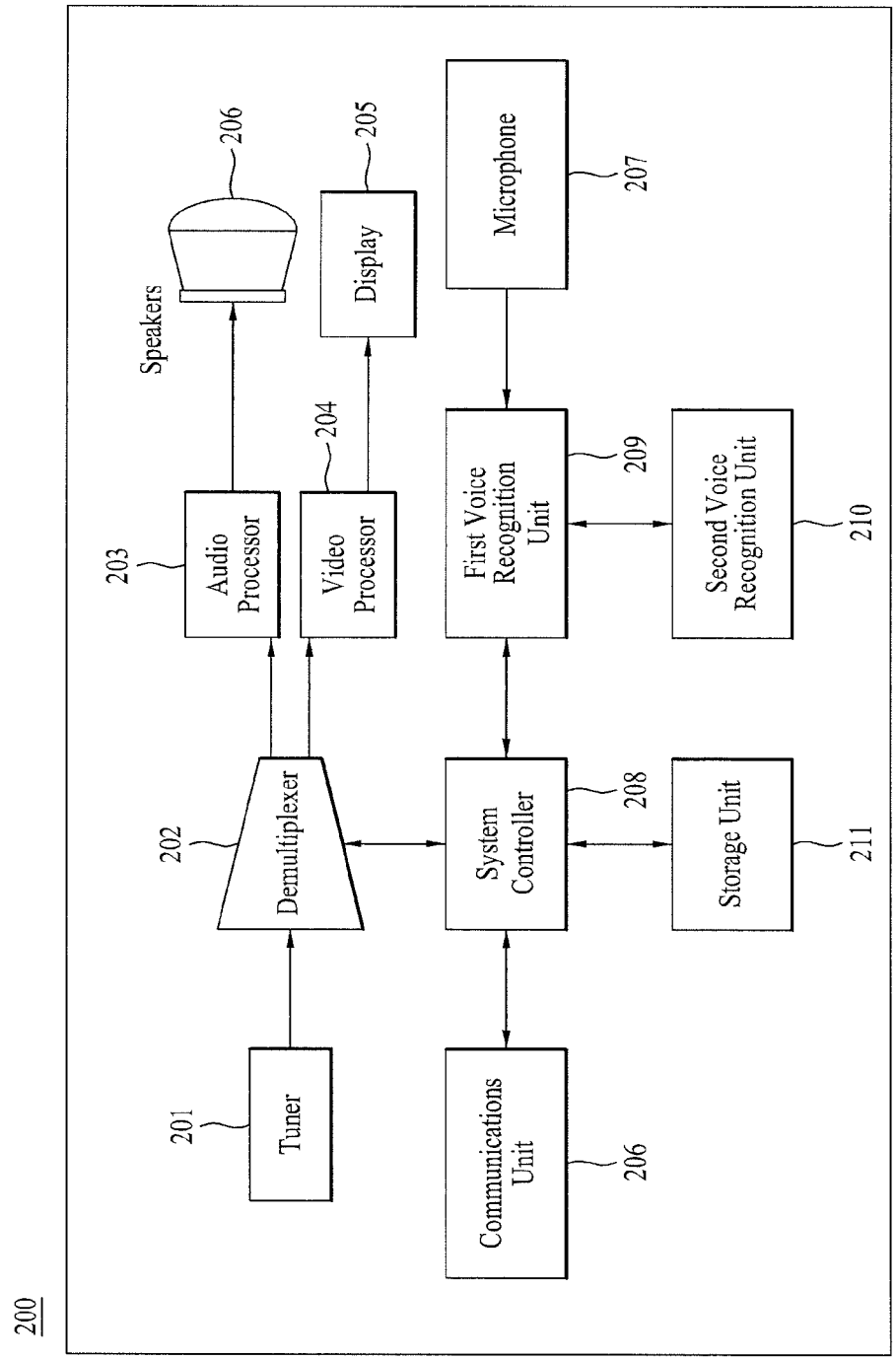
FIG. 2 illustrates a block diagram for a display device, according to the present invention.

It follows that a display device according to the present invention is able to provide quick and efficient recognition of a user's voice command by incorporating a plurality of voice recognition units. Referring to FIG. 2, a general architecture block diagram for a display device 200 according to some embodiments of the present invention is provided. It is to be appreciated that it is within the scope of the present invention to utilize display devices that may include a fewer, or greater, number of components than what is expressly illustrated in FIG. 2. The display device 200 illustrated in FIG. 2 is preferably a television set, but alternatively the display device may, for example, be a mobile telecommunications device, notebook computer, personal computer, tablet computing device, portable navigation device, portable video player or personal digital assistant (PDA).

The display device 200 includes a tuner 201, demultiplexer 202, audio processor 203, video processor 204, display 205, speakers 206, communications unit 206, microphone 207, system controller 208, first voice recognition unit 209, second voice recognition unit 210 and a storage unit 211.

Although not all specifically illustrated in FIG. 2, components of the display device 200 are able to communicate with each other via one or more communication buses or signal lines. It should also be appreciated that the components of the display device 200 may be implemented as hardware, software, or a combination of both hardware and software (e.g. middleware).

The tuner 201, which may include a plurality of different tuners, is able to be tuned to a digital broadcast channel and receive a signal including an MPEG transport stream received via services that may be multiplexed into the tuned channel. The demultiplexer 202 parses an MPEG transport stream into audio, video, and data signals. Audio signals are transmitted to the audio processor 203 in order to perform decoding of the audio signals that will bring the audio signal back to its original form for output. After an audio signal is decoded within the audio processor 203, the audio signal will be in a state that may be output by the speakers 206. Video signals are transmitted to the video processor 204 in order to perform decoding of the video signals that will bring the video signals back to its original form for output. After a video signal is decoded within the video processor 204, the video signal will be in a state that may be output on the display 205. Data signals may be transmitted to the system controller 209 for processing.

The communications unit 206, as illustrated in FIG. 2, may include RF circuitry that allows for wireless access to outside communications networks such as the Internet, Local Area Networks (LANs), Wide Area Networks (WANs) and the like. The wireless communications networks accessed by the communications unit 206 may follow various communications standards and protocols including, but not limited to, Global System for Mobile Communications (GSM), Enhanced Data GSM Environment (EDGE), code division multiple access (CDMA), wideband code division multiple access (W-CDMA), time division multiple access (TDMA), Bluetooth, Wireless Fidelity (Wi-Fi), Short Message Service (SMS) text messaging and any other relevant communications standard or protocol that allows for wireless communication by the display device 200.

Additionally, the communications unit 206 may include various input and output interfaces (not shown) for allowing wired data transfer communication between the display device 200 and an external electronics device. The interfaces may include, for example, interfaces that allow for data transfers according to the family of universal serial bus (USB) standards, the family of IEEE 1394 standards or other similar standards that relate to data transfer.

Multimedia signals that are a combination of video, audio and data signals may be received by the display device 200 via the communications unit 206. Such multimedia signals are sent to the demultiplexer 202 by the system controller 208 to be separated into individual video, audio and data signals. After the demultiplexer parses a multimedia signal into individual video, audio and data signal, video signals are sent to the video processor 204 for any decoding required to get the video signals into an original state that may be displayed, and finally the decoded video signals may be displayed on the display 205. After the demultiplexing, audio signals are sent to the audio processor 203 for any decoding required to get the audio signals into an original state that may be displayed, and finally the decoded audio signals may be output by the speakers 206. Data signals may be transmitted back to the system controller 208 for processing.

The system controller 208, in conjunction with data and instructions stored on the storage unit 211, will control the overall operation of the display device 200. In this way, the system controller 208 is capable of controlling all of the components, both as illustrated in FIG. 2 and those not specifically illustrated, of the display device 200. The storage unit 211 as illustrated in FIG. 2 may include non-volatile type memory such as non-volatile random-access memory (NVRAM) or electrically erasable programmable read-only memory (EEPROM), commonly referred to as flash memory. The storage unit 211 may also include other forms of high speed random access memory such as dynamic random-access memory (DRAM) and static random-access memory (SRAM), or may include a magnetic hard disk drive (HDD). In cases where the flexible display device is a mobile device, the storage unit 211 may additionally include a subscriber identity module (SIM) card for storing a user's profile information.

The microphone 207 is utilized by the display device 200 to pick up audio signals (e.g. user's voice input) that exist within the environment surrounding the display device 200. With respect to the present invention, the microphone 207 serves to pick up a user's voice input spoken to the display device 200. The microphone 207 is constantly in an 'on' state to ensure that a user's voice input may be received at all times. Even when the display device 200 is in an off state, the microphone may be kept on in order to allow for the display device 200 to be turned on with a user's voice input command.

The first voice recognition unit 209 receives a user's voice input that is picked up by the microphone 207 and performs a voice recognition process on the audio data corresponding to the user's voice input to interpret the meaning of the user's voice input. The first voice recognition unit 209 may then compare the interpreted voice input against a set of preset voice commands that may be stored as part of the first voice recognition unit 209. Alternatively the set of preset voice commands may be stored within the storage unit 211. If the voice input matches up to one of the preset voice commands, this information is sent to the system controller 208 and the system controller 208 may control a feature of the display device 200 accordingly. An example of preset voice commands may include "up", "hold up", "down", "hold down", "stop" and "exit".

In some embodiments, the set of preset voice commands may also include a combination of preset command words together with a user's natural language voice input. For instance if a user were to say "skip ten up" in order to skip ahead ten channels up, the first voice recognition unit 209 may be configured to recognize the words "skip" and "up" as preset command words. However, the first voice recognition unit 209 may utilize a natural language recognition process to recognize the number "ten" as indicating ten units, in this case channels. This process may be implemented on the first voice recognition unit 209 because it may not be efficient to preset all of the possible number of channels a user may want to skip ahead, and also to provide the user with greater control capabilities. For example, a television manufacturer is not able to accurately predict the number of channels that are made available due to the fact that each television content providing service allows for a wide range of available channels (e.g.

satellite provider, cable provider, ipTV provider, broadcast television provider). And in such a case it may be overly complicated to store all of the possible channel number combinations as preset voice commands. Therefore allowing the first voice recognition unit 209 to process a combination of preset voice commands and natural language voice commands provides a more efficient and flexible method for the first voice recognition unit 209 to recognize a wide array of voice commands. Alternatively, if storage of a vast set of preset voice commands is not an issue, the set of preset voice commands may be expanded to include all possible voice commands to be recognized. In this alternative case, the user's voice command, "skip ten up" would be a part of the set of preset voice commands.

If however the voice input is not recognized by the first voice recognition unit 209 as including any preset voice command words, the user's interpreted voice input is sent to the second voice recognition unit 210. When the user's interpreted voice input does not contain any words that match any of the preset voice command words, this is an indication that the user has spoken using natural language. Natural language can be thought of as a user speaking naturally, or freely, without concern for matching preset voice command words. The second voice recognition unit 210 is dedicated to processing the user's natural language voice input and determining whether a voice command was intended.

As mentioned, any voice input picked up by the microphone 207 that is not recognized as including a preset voice command word by the first voice recognition unit 209 will be sent to the second voice recognition unit 210 for processing. The second voice recognition unit 210 will then determine whether a proper voice command can be interpreted from the user's natural language voice input, and if so the determined voice command information will be sent to the system controller 208 where the system controller 208 will handle the control of a display device feature accordingly. In some alternative embodiments, the second voice recognition unit 210 may be located on an external server. In such a case, communication between the display device 200 and the second voice recognition unit 210 located on the external server may be made via the communication unit 206.

It should be understood that all subsequent reference to components of a display device made according to this invention are intended to correspond to the various components as described above.

Figure 3A:
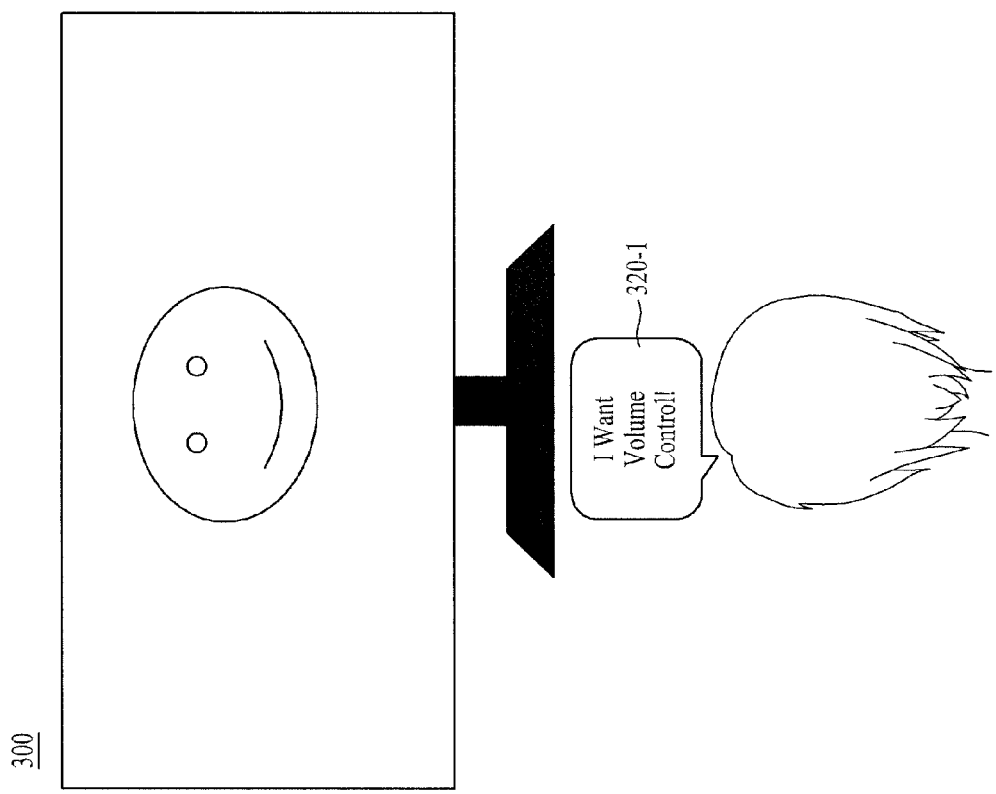
FIG. 3A illustrates a first scene for inputting a first command for initiating a voice recognition function, according to some embodiments of the present invention.

Attention is now made to FIG. 3 that illustrates a variety of scenes where a display device feature to be controlled by a user's voice input commands is a volume adjustment feature. FIG. 3A illustrates a scene where a user is enjoying a program being shown on the display device 300 in a normal viewing state. As the user is enjoying the program being shown on the display device 300, the user may decide that the volume needs to be raised. The user may then speak, "I want volume control", as a first voice input 320-1. The user's first voice input 320-1 is picked up by a microphone of the display device 300.

From the microphone, the user's first voice input 320-1 is processed at a first voice recognition unit in order to interpret the first voice input 320-1 into vocabulary information. The first voice recognition unit will then compare the interpreted first voice input 320-1 against a set of preset voice command words to determine whether any of the words spoken by the user's first voice input 320-1 matches a preset voice command. In this example, the first voice input 320-1 may be understood to be a natural language voice input that does not contain preset voice command words. Therefore because the first voice input 320-1 is found to not contain preset voice command words, the first voice recognition unit will send the vocabulary information corresponding to the first voice input 320-1 to a second voice recognition unit. In some embodiments, the first voice input 320-1 audio information may also be sent to the second voice recognition unit.

The second voice recognition unit is dedicated to processing a user's voice input that is not matched with preset voice command words at the first voice recognition unit. Such voice inputs may be referred to as natural language voice inputs. So in this case, the user's first voice input 320-1 was not recognized by the first voice recognition unit as matching preset voice command words, and therefore the first voice input 320-1 has been sent to the second voice recognition unit for processing. The second voice recognition unit will process the vocabulary information corresponding to the first voice input 320-1 and compare it against a database of words to get an estimation for what command the user may have intended by the first voice input 320-1. In addition, the second voice recognition unit may also take into account the current state of the display device to get a more accurate estimation of what the user's intended voice command was. So by processing the words of the first voice input 320-1, "I want volume control", and taking into account that the display device 300 is in a default viewing state, the second voice recognition unit may determine that the user is attempting to initiate a voice command mode on the display device 300. When the second voice recognition unit determines that the best estimation for the intention of the user's first voice input 320-1 is to initiate the voice command mode, the second voice recognition unit will communicate this information to a system controller of the display device 300. The system controller will then make the necessary steps to initiate the voice command mode.

FIG. 3B illustrates the display device in a state where the voice command mode has been initiated. By first initiating the voice command mode, a first menu 301-1 may be displayed. The first menu 301-1 is comprised of a list of preset voice command words that are available for the user to speak in order to control certain volume control features. For example, the first menu 301-1 illustrated by FIG. 3B is seen to include the following preset voice command words: "Up", "Hold Up", "Down", "Hold Down" and "Volume" Number. Also displayed on the display device 300 while the voice command mode is active is a volume display graph 302 and a volume display box 303. The volume display graph 302 and the volume display box 303 are displayed in order to provide a graphical and numerical representation, respectively, of the current volume on the display device 300. For instance, in FIG. 3B the volume display graph 302 and the volume display box 303 indicate that the display device 300 is in a state where the volume is at five. Although both the volume display graph 302 and the volume display box 303 are depicted to be displayed simultaneously, in some embodiments either one of the volume display graph 302 or the volume display box 303 may be displayed individually.

In the scene depicted by FIG. 3B the user is seen to have spoken a second voice input 320-2, "Up", which is picked up by the microphone of the display device 300. Because all of the voice commands seen on the first menu 301-1 are part of the set of preset voice command words stored on the display device 300, the second voice input, "Up", is processed by the first voice recognition unit and recognized by the first voice recognition unit as a voice command for increasing the volume by a single unit. Therefore the system controller of the display device 300 will know to control the volume feature by increasing the volume by a single unit in response to the user's second voice input 320-2. It should be noted that the microphone of the display device 300 is able to pick up the user's second voice input 320-2 from amongst the background noise 321 and 322.

The result of the user's second voice input 320-2 is illustrated in FIG. 3C where the volume is shown to have been increased by a single unit. Both the volume display graph 302 and the volume display box 303 are depicted as indicating that the volume has increased by a single unit, from five to six. The scene depicted in FIG. 3C also illustrates a second menu 301-2 being displayed that offers the additional available voice command words "Stop" and "Exit". While the current embodiment of the display device 300 contemplates having a first menu 301-1 when the voice command mode is first initiated and having a second menu-2 during the continued use of the voice command mode, other embodiments of the present invention may only have a single available voice command menu during the entire operation of the voice command mode. It is also noted that, although some embodiments of the present invention may utilize a number of different menus describing a different set of available voice command words, the set of available voice command words stored within a storage unit remain the same and may therefore be available at any time. For instance, although the voice command word "Exit" is displayed in the second menu 301-2 and not displayed in the first menu 301-1, the display device may still recognize and process a user's voice input that speaks "Exit" when only the first menu 301-1 is displayed.

In the scene depicted by FIG. 3C the user is now seen as speaking the command, "Hold up", as a third voice input 320-3. This third voice input 320-3 is also picked up from amongst the background noise 321 and 322 by the microphone of the display device 300. The third voice input 320-3 is also included in the set of preset voice command words stored on the display device 300, and therefore the user's third voice input 320-3 is processed and recognized by the first voice recognition unit. The first voice recognition unit then communicates the intention of the user's third voice input 320-3 to the system controller which will then control the volume feature of the display device 300 according to the "Hold up" voice command. In some embodiments, the "Hold up" voice command may incrementally increase the volume feature of the display device 300 by a predetermined number of units. For example the volume may be increased by ten units according to some embodiments in response to the "Hold up" voice command. In other embodiments, the voice command "Hold up" may result in the indefinite increasing of the volume feature until a subsequent voice command (e.g. "Stop" or "Exit") is recognized for ceasing the increase of the volume. This may be similar to a user physically pressing down on the volume up button on a remote controller.

While the volume feature is in the process of being increased in response to the "Hold up" voice command implementation, the user may say a fourth voice input 320-4, "Stop", for ceasing the increase of the volume as depicted in FIG. 3D. Although under normal conditions the volume would have continued to increase in response to the "Hold up" voice command, the user's fourth voice input 320-4 is seen to have interrupted the further increase of the volume. The volume display graph 302 and the volume display box 303 indicate that the volume increase was interrupted after the volume had reached nine units.

The user's fourth voice input 320-4 is part of the set of preset voice command words that are available, as illustrated by the second menu 301-2. Therefore after the user's fourth voice input 320-4 is picked up by the microphone from amongst the background noise 321, the fourth voice input 320-4 may be processed and recognized by the first voice recognition unit. Then the first voice recognition unit communicates the intended command of the fourth voice input 320-4 to the display device's system controller, where the system controller will implement the control of the volume according to the user's fourth voice input 320-4. In this case the user's fourth voice input 320-4, "Stop", corresponds to a command for stopping the incremental increase of the volume feature. Alternatively, if the volume feature was in the process of being incrementally decreased, the fourth voice input 320-4, "Stop", may similarly result in the stopping of the incremental decrease of the volume.

As mentioned above, one of the unique features of the first recognition unit is the ability to recognize a user's voice command that is comprised of both preset words and natural language words. To better illustrate this feature of the first voice recognition unit, in FIG. 3E the user is seen to speak a fifth voice input 320-5, "Volume twenty two", that is comprised of both preset words and natural language words. The fifth voice input 320-5 is picked up by the microphone of the display device 300 amongst the background noise 321. Once the first voice recognition unit receives the fifth voice input 320-5, the first voice recognition unit will process the fifth voice input 320-5 in order to interpret the audio information of the fifth voice input 320-5 into vocabulary information. After processing the fifth voice input 320-5, the first voice recognition unit will recognize that "Volume" is a preset voice command word, however the number "twenty two" may or may not be included as part of the set of preset voice command words. In the case that the number "twenty two" is not recognized as a preset voice command words, the first voice recognition unit may further perform natural language voice recognition to determine the interpretation for the "twenty two" audio information portion of the user's fifth voice input 320-5. In some embodiments, the first voice recognition unit may alternatively communicate with the second voice recognition unit when natural language voice recognition is required.

In either case, the first voice recognition unit is able to accomplish natural language voice recognition on the portion of the user's fifth voice input 320-5 that is not immediately recognized as a preset voice command word. After completing the voice recognition, the first voice recognition unit is able to recognize that the fifth voice input 320-5 is intended to modify the volume of the display device 300 to twenty two units. This information is then relayed from the first voice recognition unit to the system controller of the display device 300, which in turn will modify the volume of the display device 300 to twenty two units. The resulting volume change is displayed on the display device 300 illustrated in FIG. 3F.

Figure 3F:
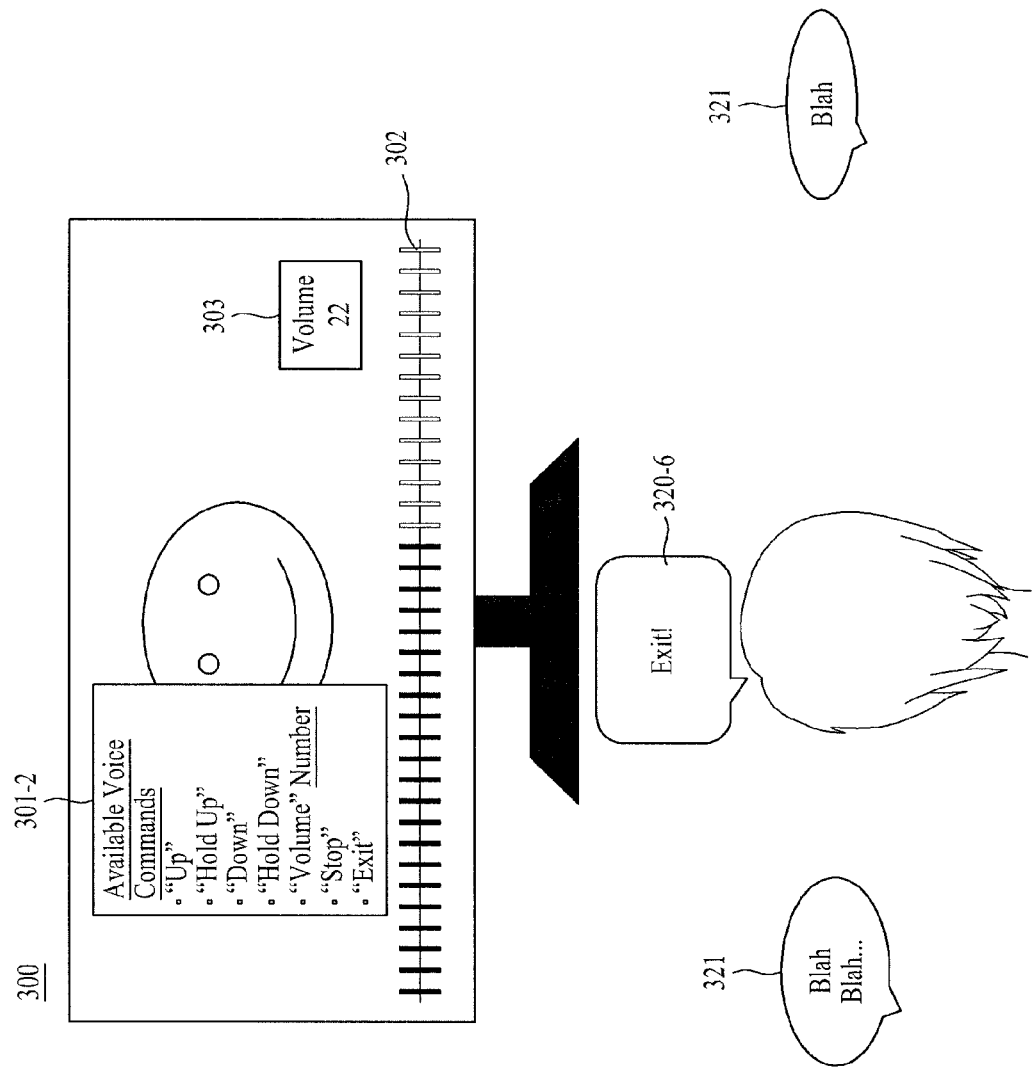
FIG. 3F illustrates a sixth scene for inputting a sixth voice command for ending the voice recognition function, according to some embodiments of the present invention.

Although in the scene depicted in FIG. 3F it is assumed that the number portion of the fifth voice input 320-5 must be processed under natural language voice recognition, in some embodiments the audio information corresponding to the number portion of a user's voice input may simply be stored as one of the preset voice command words. In some instances this may be more efficient than interpreting the audio information corresponding to numbers using natural language voice recognition. For instance, numbers that correspond to all possible volume levels may be configured to be part of the set of preset voice command words.

FIG. 3F illustrates the display device 300 in a state following the execution of the user's fifth voice input 320-5. Therefore the volume display graph 302 and the volume display box 303 both indicate that the current volume of the display device 300 is set a twenty two. In this state, the user is also seen to speak a sixth voice input 320-6, "Exit", that is intended to exit the voice command mode of the display device 300. The user's sixth voice input 320-6 is picked up by the microphone of the display device 300 from amongst the background noise 321, and the sixth voice input 320-6 is sent to the first voice recognition unit.

The user's sixth voice input 320-6 is processed by the first voice recognition unit and recognized to correspond to a preset voice command word. The interpreted voice command is then sent to the system controller that will in turn implement the voice command, which in this case is to exit the voice command mode. The result is depicted in FIG. 3G where the display device 300 is returned to a normal viewing state. Although FIG. 3G is illustrated to have the volume display box 303 remain on the display screen of the display device 300 when the display device 300 is returned to the normal viewing state, in some embodiments the volume display box 303 may not be displayed following the exit from the voice command mode.

The voice command mode according to the present invention is made available for any feature of the display device that may be incrementally increased or decreased. Other such features include a color adjustment feature (e.g. color brightness, color contrast, color sharpness), display adjustment feature (e.g. adjusting the position of the displayed picture up, down, left or right) and a channel change feature. In order to further provide description of the present invention attention will be given to a voice command mode for a channel adjustment feature of the display device.

FIG. 4 illustrates a variety of scenes where a channel change feature is controlled by a user's voice input command. FIG. 4A illustrates a scene where a user is enjoying a program being shown on the display device 400 in a normal viewing state. As the user is enjoying the program being shown on the display device 400, the user may decide to change the channel. The user may then speak, "I want channel control", as a first voice input 420-1. The user's first voice input 420-1 is picked up by a microphone of the display device 400.

From the microphone, the user's first voice input 420-1 is processed at a first voice recognition unit in order to interpret the audio information of the first voice input 420-1 into vocabulary information. The first voice recognition unit will then compare the interpreted first voice input 420-1 against a set of preset voice command words to determine whether any of the words spoken by the user's first voice input 420-1 matches a preset voice command. In this example, the first voice input 420-1 may be understood to be a natural language voice input that does not contain preset voice command words. Therefore because the first voice input 420-1 is found to not contain preset voice command words, the first voice recognition unit will send the vocabulary information corresponding to the first voice input 420-1 to a second voice recognition unit. In some embodiments, the first voice input 420-1 audio information may also be sent to the second voice recognition unit.

The second voice recognition unit is dedicated to processing a user's voice input that is not matched with preset voice command words at the first voice recognition unit. Such voice inputs may be referred to as natural language voice inputs. So in this case, the user's first voice input 420-1 was not recognized by the first voice recognition unit as matching preset voice command words, and therefore the first voice input 420-1 has been sent to the second voice recognition unit for processing. The second voice recognition unit will process the vocabulary information corresponding to the first voice input 420-1 and compare it against a database of words to get an estimation for what command the user may have intended by the first voice input 420-1. In addition, the second voice recognition unit may also take into account the current state of the display device to get a more accurate estimation of what the user's intended voice command was. So by processing the words of the first voice input 420-1, "I want channel control", and taking into account that the display device 400 is in a default viewing state, the second voice recognition unit may determine that the user is attempting to initiate a voice command mode on the display device 400. When the second voice recognition unit determines that the best estimation for the intention of the user's first voice input 420-1 is to initiate the voice command mode, the second voice recognition unit will communicate this information to a system controller of the display device 400. The system controller will then make the necessary steps to initiate the voice command mode.

Figure 4B:
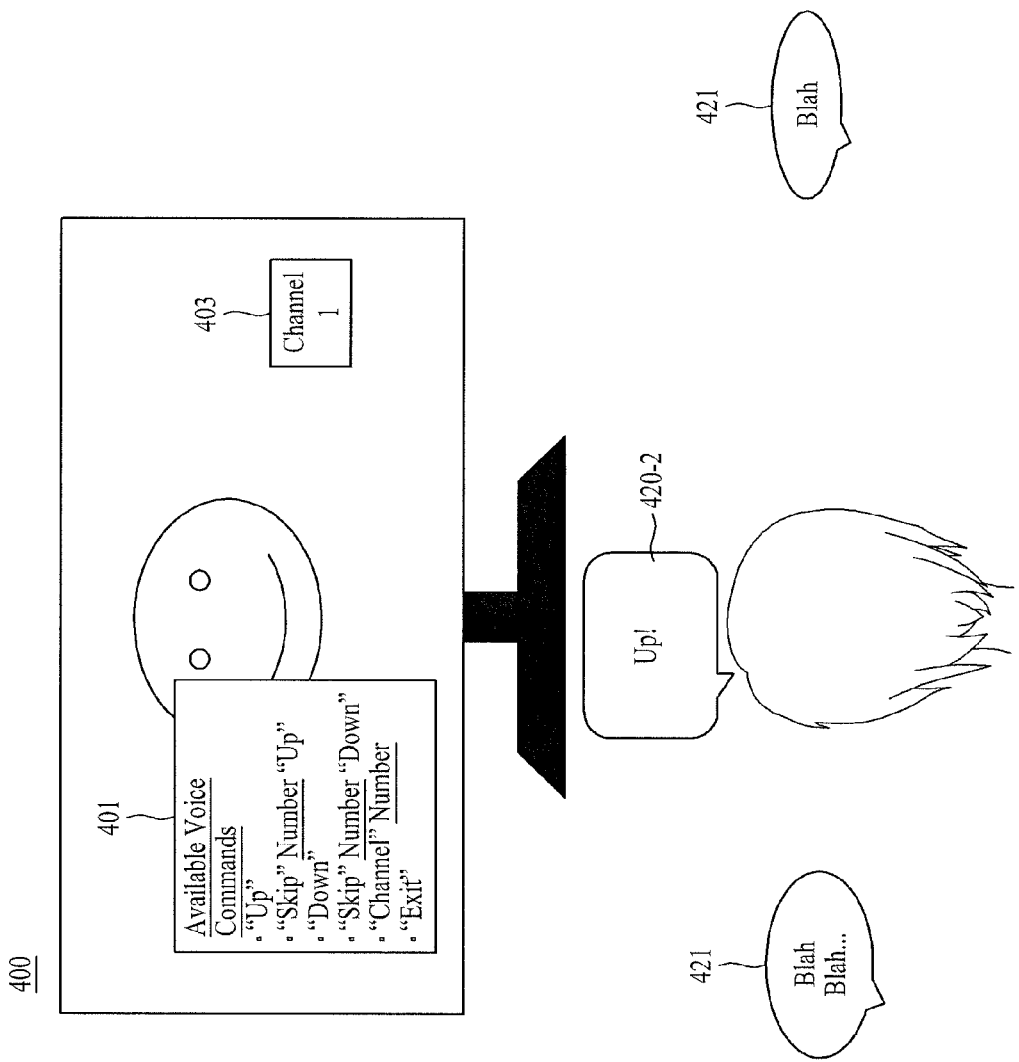
FIG. 4B illustrates a second scene for inputting a second voice command, according to some embodiments of the present invention.

FIG. 4B illustrates the display device in a state where the voice command mode has been initiated. By first initiating the voice command mode, a menu 401 may be displayed. The menu 401 is comprised of a list of preset voice command words that are available for the user to speak in order to control certain volume control features. For example, the menu 401 illustrated by FIG. 4B is seen to include the following preset voice command words: "Up", "Skip" Number "Up", "Down", "Skip" Number "Down", "Channel" Number and "Exit". Also displayed on the display device 400 while the voice command mode is active is a channel display box 403. The channel display box 403 is displayed in order to provide a numerical representation of the current channel on the display device 400. For instance, in FIG. 4B the channel display box 403 indicates that the display device 400 is in a state where the currently viewing channel is channel one (1).

In the scene depicted by FIG. 4B the user is seen to have spoken a second voice input 420-2, "Up", which is picked up by the microphone of the display device 400. Because all of the voice commands seen on the menu 401 are part of the set of preset voice command words stored on the display device 400, the second voice input, "Up", is processed by the first voice recognition unit and recognized by the first voice recognition unit as a voice command for increasing the current channel by a single channel. Therefore the system controller of the display device 400 will know to control the channel feature by increasing the current channel by a single channel in response to the user's second voice input 420-2. It should be noted that the microphone of the display device 400 is able to pick up the user's second voice input 420-2 from amongst the background noise 421.

The result of the user's second voice input 420-2 is illustrated in FIG. 4C where the channel is shown to have been increased by a single channel, from channel one (1) to channel two (2). A visual indication is given by the channel display box 403 that indicates the current channel is now channel two (2).

In the scene depicted by FIG. 4C the user is now seen as speaking the command, "Skip ten up", as a third voice input 420-3. This third voice input 420-3 is also picked up from amongst the background noise 421 by the microphone of the display device 400. The third voice input 420-3 is comprised of both preset words and natural language words. Once the first voice recognition unit receives the third voice input 420-3, the first voice recognition unit will process the third voice input 420-3 in order to interpret the audio information of the fifth third voice input 420-3 into vocabulary information. After processing the third voice input 420-3, the first voice recognition unit will recognize that "Volume" is a preset voice command word, however the number "ten" may or may not be included as part of the set of preset voice command words. In the case that the number "ten" is not recognized as a preset voice command words, the first voice recognition unit may further perform natural language voice recognition to determine the interpretation for the "ten" audio information portion of the user's third voice input 420-3. In some embodiments, the first voice recognition unit may alternatively communicate with the second voice recognition unit when natural language voice recognition is required.

In either case, the first voice recognition unit is able to accomplish natural language voice recognition on the portion of the user's third voice input 420-3 that is not immediately recognized as a preset voice command word. After completing the voice recognition, the first voice recognition unit is able to recognize that the third voice input 420-3 is intended to modify the channel of the display device 400 to increase by ten channels. This information is then relayed from the first voice recognition unit to the system controller of the display device 400, which in turn will change the current channel of the display device 400 to a channel that is ten channels above the previous current channel. The resulting channel change is displayed on the display device 400 illustrated in FIG. 4D where the channel display box 403 displays the current channel as twelve (12).

Although in the scene depicted in FIG. 4C it is assumed that the number portion of the third voice input 420-3 must be processed under natural language voice recognition, in some embodiments the audio information corresponding to the number portion of a user's voice input may simply be stored as one of the preset voice command words. In some instances this may be more efficient than interpreting the audio information corresponding to numbers using natural language voice recognition. For instance, numbers that correspond to a range of all available channels may be configured to be part of the set of preset voice command words.

FIG. 4D illustrates the display device 400 in a state following the execution of the user's third voice input 420-3. Therefore the channel display box 403 indicate that the current channel of the display device 400 is channel twelve (12). In this state, the user is also seen to speak a fourth voice input 420-4, "Exit", that is intended to exit the voice command mode of the display device 400. The user's fourth voice input 420-4 is picked up by the microphone of the display device 400 from amongst the background noise 421, and the fourth voice input 420-4 is sent to the first voice recognition unit.

The user's fourth voice input 420-4 is processed by the first voice recognition unit and recognized to correspond to a preset voice command word. The interpreted voice command is then sent to the system controller that will in turn implement the voice command, which in this case is to exit the voice command mode. The result is depicted in FIG. 4E where the display device 400 is returned to a normal viewing state. Although FIG. 4E is illustrated to have the channel display box 403 remain on the display screen of the display device 400 when the display device 400 is returned to the normal viewing state, in some embodiments the channel display box 403 may not be displayed following the exit from the voice command mode.

Figure 5:
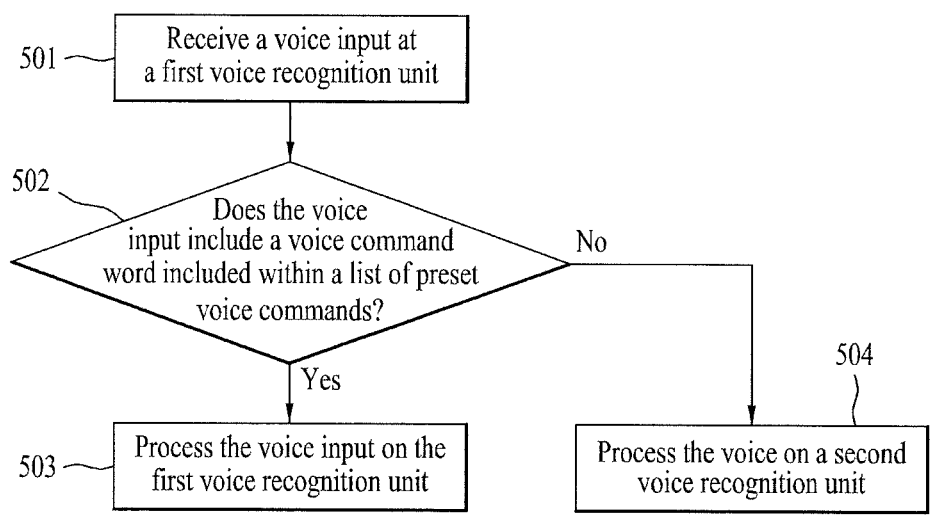
FIG. 5 illustrates a flowchart describing a set of operating steps, according to some embodiments of the present invention.

FIG. 5 is a flowchart describing a sequence of steps for initially entering a voice command mode on a display device according to some embodiments of the present invention. While viewing content on a display device, a user may decide to initiate a voice command mode on the display device. One method for initiating the voice command mode is to make a voice input asking the display device to start the voice command mode. So in step 501 the user may speak a voice input which is picked up by a microphone of the display device, and subsequently received by a first voice recognition unit.

At the first voice recognition unit, the first voice recognition unit will compare the user's voice input against a list of preset voice command words as seen in step 502. Now if the user's voice input matches up to a voice command word that is part of the list of preset voice command words, the user's voice input will remain in the first voice recognition unit and be processed by the first voice recognition unit as seen in step 503. The processing of the voice input includes at least interpreting the voice input, matching the voice input to a voice command word that is included in the list of preset voice command words and transmitting the proper control information to a system controller to implement the proper controls on the display device.

If however none of the words that comprise the user's voice input match up against the voice command words that are included in the list of preset voice command words, the user's voice input is sent to a second voice recognition unit for further processing. The further processing done by the second voice recognition unit includes at least performing a natural language voice recognition on the user's voice input to determine the interpretation of the user's voice input. Once the natural language voice recognition process is accomplished on the user's voice input by the second voice recognition unit, the display device may determine whether the user's voice input corresponds to a proper voice command that may be used to control a feature of the display device.

Figure 6:
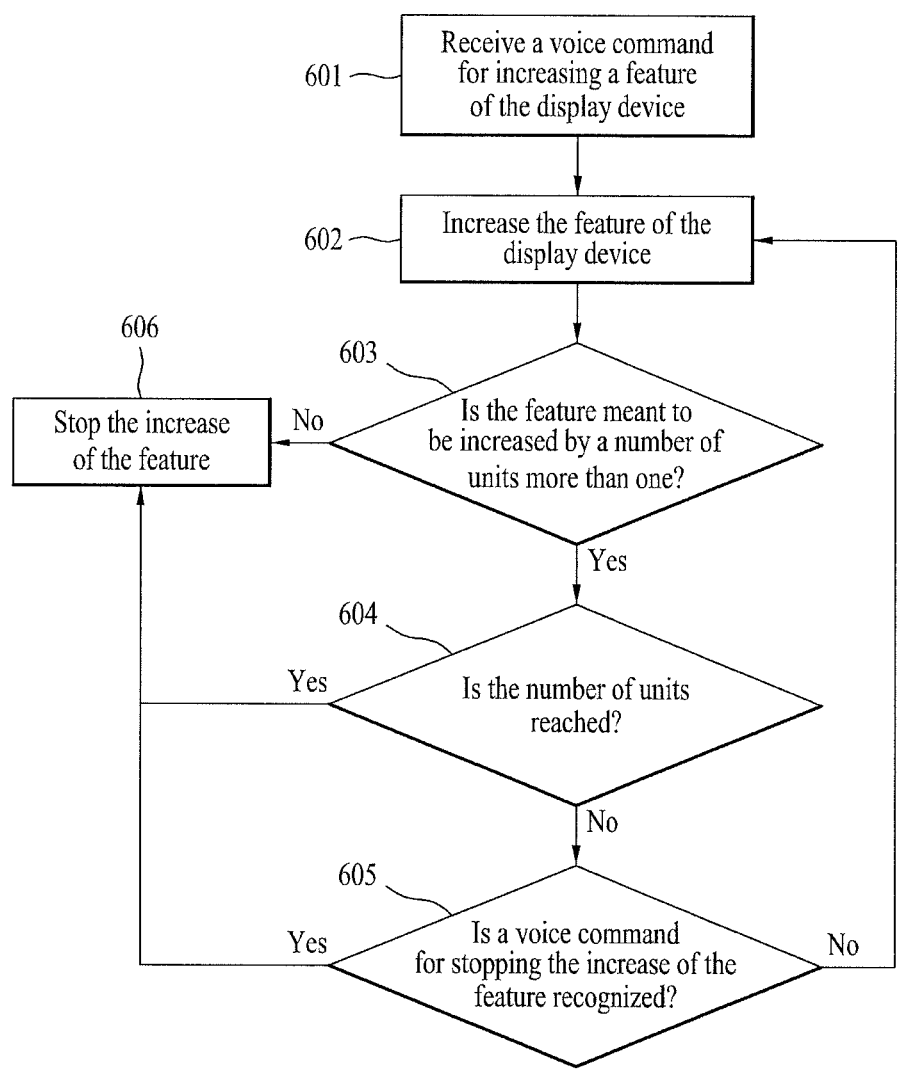
FIG. 6 illustrates a flowchart describing another set of operating steps, according to some embodiments of the present invention.

FIG. 6 illustrates a flowchart describing a sequence of steps for utilizing voice commands for controlling a feature of a display device according to a voice command mode of the present invention. At step 601a user speaks a voice command for increasing a feature of a display device. Examples of possible features may include a volume, color, or channel feature of the display device. And assuming that one of either a first voice recognition unit or second voice recognition unit has properly processed the user's voice command as described for the sequence depicted in FIG. 5, at step 602 the feature of the display device is increased.

Next in step 603 the display device determines whether the user's voice command intended to increase the feature by more than one unit. If the voice command was intended to only increase the feature of the display device by one unit, then in step 606 the increase of the feature is stopped. An example of such a situation is where a user may use a voice command to increase the current channel to a next higher channel. In such a situation the voice command is intended to only increase the channel by one, and after the first increase no further increase is necessary.

However there may be other voice commands that are intended to increase a feature of the display device by more than a single unit. For example, a user's voice command may be intended to incrementally increase the volume of a display device by ten units. Then the volume would be increased incrementally until it is increased ten units higher than the volume setting prior to the voice command was recognized. So if the user's voice command was meant to increase the feature of the display device by more than one, then the sequence moves on to step 604.

In step 604, the display device determines whether the number of units that the feature of the display device was intended to be increased by according to the user's voice command has been reached. In other words, if the user's voice command intended to increase a volume feature by ten units, step 604 is where the display device must determine whether the volume feature has indeed been increased by ten. If the display device determines that the number has been reached, then the feature of the display device ceases to be increased as described in step 606. However if the display device determines that the number has not yet been reached, the sequence advances to step 605.

In step 605 the display device determines whether a subsequent voice command for stopping the increase of the display device feature has been spoken by the user. If the user has indeed spoken a voice command for stopping the increase of the feature, and the display device has recognized the voice command for stopping the increase of the feature, then step 606 describes the display device stopping the increase of the feature. However if no such voice command for stopping the increase of the feature has been recognized by the display device, then the sequence goes back to step 602 where the feature is incrementally increased.

It should be apparent that the previously described flowcharts that described processes according to the present invention may include more or fewer operational steps than those expressly illustrated in the flowcharts. Also, each of the operational steps described in the previously described flowcharts of FIGS. 5 and 6 may be executed serially or in parallel with respect to each other.

In addition, although the present invention has been expressly described in terms of handling only a volume setting feature and a channel setting feature of the display device, it is within the scope of the present invention to utilize the voice command operations to handle a variety of different features. For example, the voice command operations according to the present invention may be utilized to handle volume, channel, color, brightness, contrast, menu or page setting features of a display device.

Overall, it will be apparent to those skilled in the art that various modifications and variations can be made in the present invention. Thus, although the foregoing description has been described with reference to specific examples and embodiments, these are not intended to be exhaustive or to limit the invention to only those examples and embodiments specifically described.

What is claimed is:

1. A method of recognizing voice input commands by a display device, the method comprising:
receiving a first voice input comprising (i) a preset word that is a first portion of the first voice input and (ii) a natural language word that is a second portion of the first voice input;
recognizing, by a first voice recognizing unit, the preset word that is the first portion of the first voice input as a preset voice command to be processed by the first voice recognizing unit;
recognizing, by the first voice recognizing unit, the natural language word that is the second portion of the first voice input as a natural language voice command to be processed by a second voice recognizing unit;
processing the preset voice command, by the first voice recognizing unit;
processing the natural language voice command, by the second voice recognizing unit; and
controlling a feature of the display device according to the processed preset voice command and the processed natural language voice command,
wherein the first voice input is a single sentence comprising the preset word and the natural language word.

2. The method of claim 1, wherein the preset voice command is a natural language voice command, and the recognition of the preset voice command initiates a voice input command mode.

3. The method of claim 1, wherein the feature of the display device controlled according to the processed preset voice command and the processed natural language voice command comprises displaying a first menu of available voice commands.

4. The method of claim 3, further comprising:
receiving a second voice input;
recognizing, by the first voice recognizing unit, the second voice input as a second voice command to be processed by the first voice recognizing unit;
processing the second voice command, by the first voice recognizing unit, and
controlling a feature of the display device according to the second voice command.

5. The method of claim 4, wherein the second voice command corresponds to one of the voice commands displayed on the first menu of available voice commands, as only voice inputs corresponding to voice commands displayed on the first menu of available voice commands are recognized by the first voice recognizing unit.

6. The method of claim 4, wherein the feature of the display device is controlled to increase by one unit of a display device setting in response to the second voice command.

7. The method of claim 6, wherein the feature of the display device is one of a volume, channel, color, brightness, contrast, menu or page setting.

8. The method of claim 4, wherein the feature of the display device is controlled to increase by a predetermined number of display device setting units in response to the second voice command.

9. The method of claim 8, wherein the feature of the display device is one of a volume, channel, color, brightness, contrast, menu or page setting.

10. The method of claim 4, further comprising:
displaying a second menu of available voice commands, wherein the second menu includes at least one new available voice command not displayed on the first menu of available voice commands.

11. The method of claim 1, wherein the first voice input is received through an external network.

12. The method of claim 1, wherein the first voice recognizing unit and the second voice recognizing unit are embedded as part of the circuitry of the display device, the first voice recognizing unit and the second voice recognizing unit are located on an external server, or the first voice recognizing unit is embedded as part of the circuitry of the display device and the second voice recognition unit is located on an external server.

13. A display device comprising:
a microphone configured to receive a first voice input comprising a preset word that is a first portion of the first voice input and a natural language word that is a second portion of the first voice input;
a first voice recognizing unit configured to:
recognize the preset word that is the first portion of the first voice input as a preset voice command and the natural language word that is the second portion of the first voice input as a natural language voice command; and
process the preset voice command;
a second voice recognizing unit configured to receive the natural language voice command from the first voice recognizing unit and process the natural language voice command; and
a system controller configured to control a feature of the display device in accordance to the preset voice command and the natural language voice command processed from the first voice input,
wherein the first voice input is a single sentence comprising the preset word and the natural language word including two portions of the preset word and the natural language word.

14. The display device of claim 13, wherein the preset voice command is a natural language voice command, and the recognition of the preset voice command initiates a voice input command mode.

15. The display device of claim 13, further comprising:
a display configured to display a first menu of available voice commands, wherein the display of the first menu of available voice commands is the feature controlled according to the processed preset voice command and the processed natural language voice command.

16. The display device of claim 15, wherein the first voice recognizing unit is further configured to receive a second voice input and process the second voice input to obtain a second voice command, and
wherein the system controller is further configured to control a feature of the display device in accordance to the second voice command.

17. The display device of claim 16, wherein the second voice command corresponds to one of the voice commands displayed on the first menu of available voice commands, as only voice inputs corresponding to voice commands displayed on the menu of available voice commands are recognized by the first voice recognizing unit.

18. The display device of claim 16, wherein the feature of the display device is controlled to increase by one unit in response to the second voice command.

19. The display device of claim 18, wherein the feature of the display device is one of a volume, channel, color, brightness, contrast, menu or page setting.

20. The display device of claim 16, wherein the feature of the display device is controlled to increase by a predetermined number of units in response to the second voice command.

21. The display device of claim 20, wherein the feature of the display device is one of a volume, channel, color, brightness, contrast, menu or page setting.

22. The display device of claim 16, wherein a second menu of available voice commands is displayed following the controlling of the feature of the display device according to the second voice command, wherein the second menu includes at least one additional voice command from the first menu of available voice commands.

23. The display device of claim 16, wherein the second voice recognizing unit is located on an external server.

24. The display device of claim 13, wherein the first voice input is received through an external network.

* * * * *